INVENTOR.
JOHN P. HESTER
By Huebner & Worrel
ATTORNEYS.

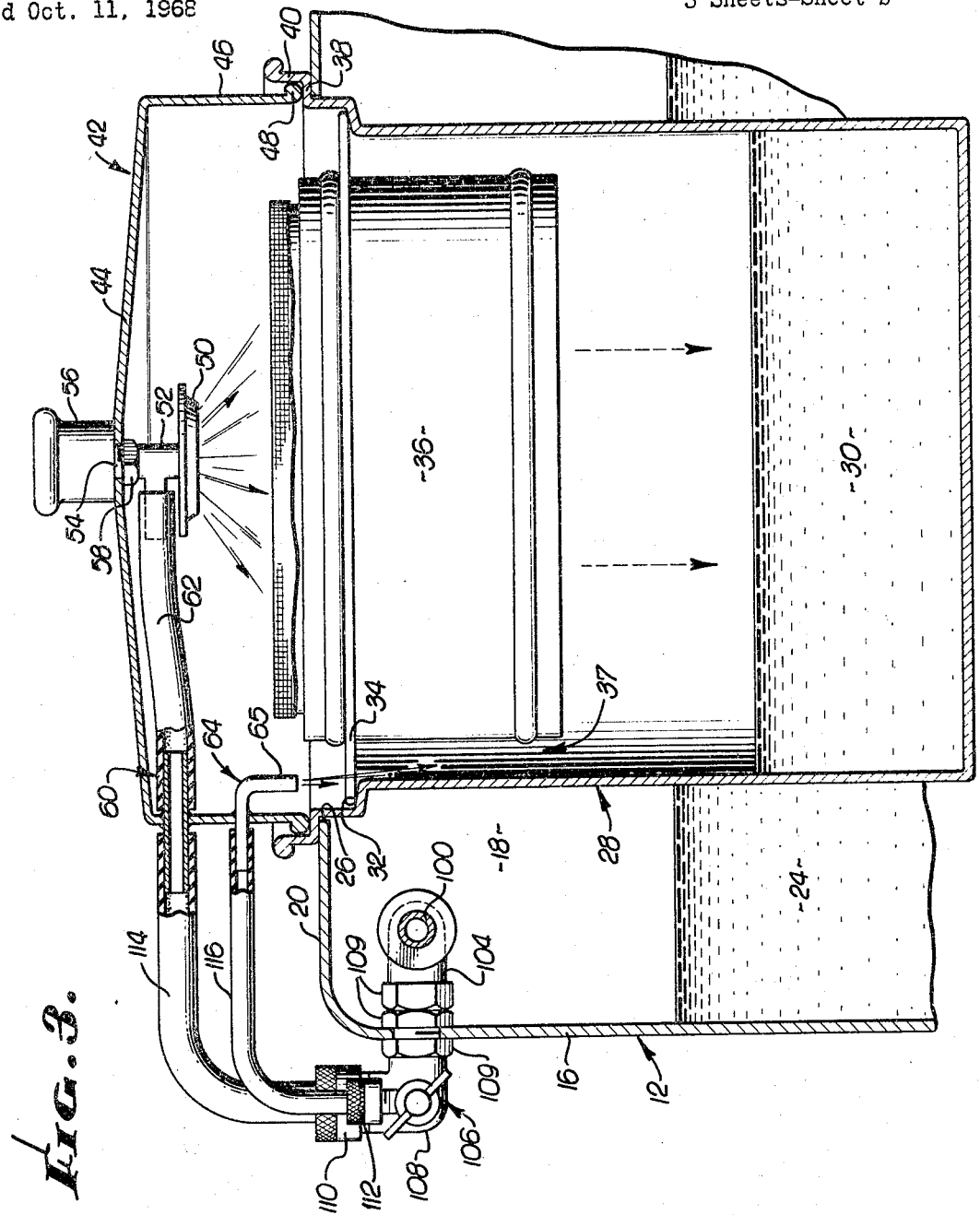

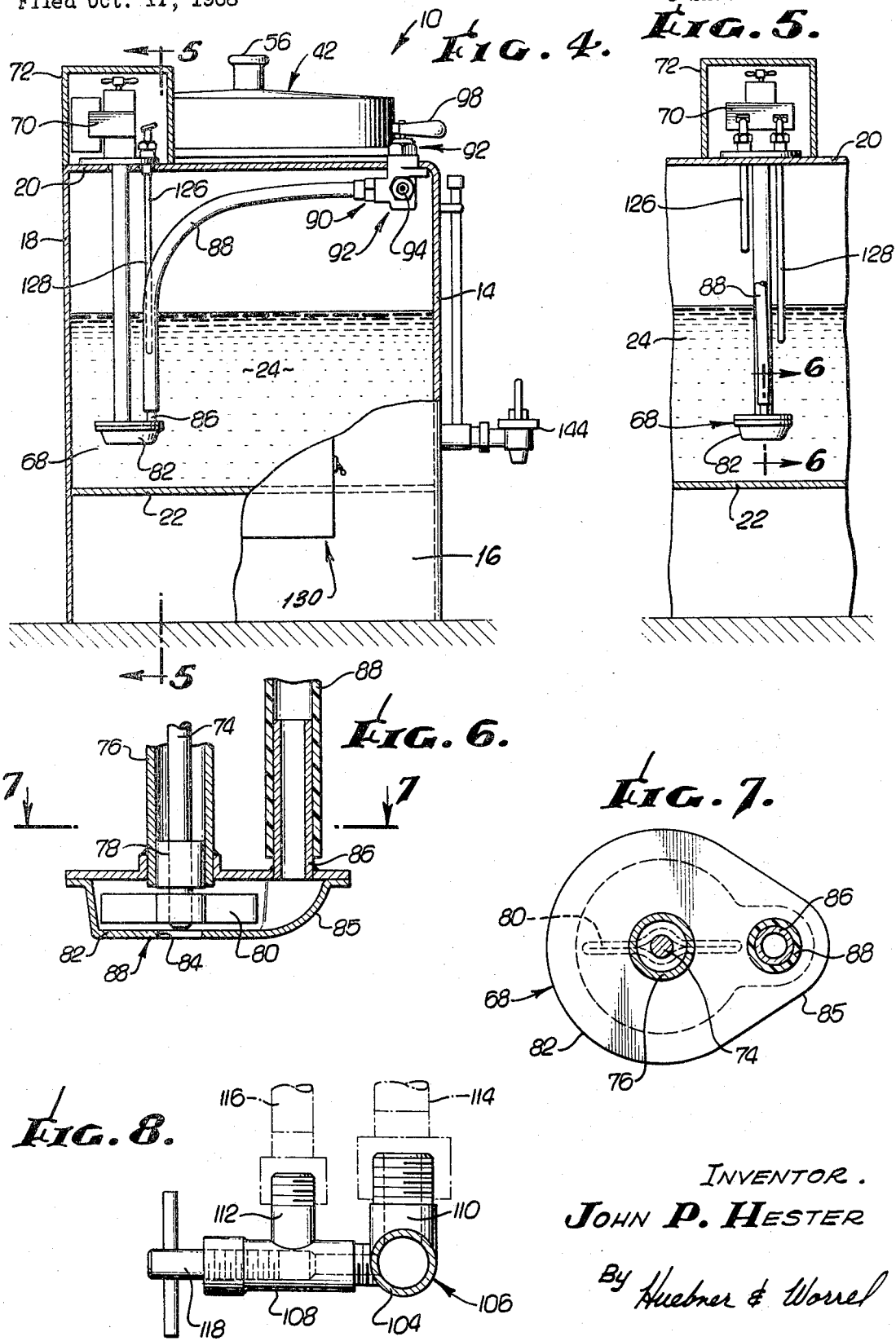

United States Patent Office 3,520,247
Patented July 14, 1970

3,520,247
AUTOMATIC BYPASS HOT WATER FEED FOR COFFEE URN
John P. Hester, Garden Grove, Calif., assignor to Margaret A. Curtis, North Hollywood, Calif.
Filed Oct. 11, 1968, Ser. No. 766,803
Int. Cl. A47j 31/04
U.S. Cl. 99—283    8 Claims

ABSTRACT OF THE DISCLOSURE

Apparatus for delivering hot water to a coffee brewing kettle in a restaurant type coffee urn. A pump provides hot water for a controlled interval of time from the reservoir formed by the urn shell through flexible conduit means to dispensing means supported inside the brew kettle lid. A portion of this hot water is dispensed from the central part of the lid through a bed of coffee grounds in the kettle, while the remainder of this hot water is dispensed from a peripheral part of the lid into the brew kettle, bypassing the bed of coffee grounds.

BACKGROUND OF THE INVENTION

Conventional restaurant type drip coffee urns include an outer jacket or shell which serves as a vessel for heating and storing hot water from which coffee is brewed, and one or more brew kettles which fit into respective circular apertures in the top wall of the jacket or shell and extend down into the vessel. Each brew kettle is provided with a basket or riser removably supportable in the upper portion thereof to receive a bed of coffee grounds, and a lid is removably engageable over the top of the kettle, either being completely removable from the kettle or being hingedly supported on the urn jacket or shell for swinging movement into and out of covering engagement with the kettle. With such a conventional restaurant type coffee urn, coffee is normally brewed in one of the kettles by raising the lid of the kettle, suspending a basket or riser having coffee grounds therein within the upper portion of the kettle, and then pouring hot water into the bed of coffee grounds, such hot water dripping down through the coffee grounds to provide the brewed coffee.

The most common method of pouring the hot water over the coffee grounds is to hold a hot water receptacle in the hand and draw off hot water into this receptacle from the vessel formed by the urn jacket through a suitable spigot, and then manually pour this water through the grounds while the kettle lid is removed from the kettle.

Another method of pouring hot water over the coffee grounds in some of the more modern urns is to utilize a pivoted pouring spout mounted on the top wall of the urn shell and fed by a suitable pump. Such a spout is swung into position over the bed of coffee grounds with the kettle lid removed, or is swung into alignment with a suitable orifice in the kettle lid, and the hot water is then pumped out through the spout and discharged through the bed of coffee grounds.

According to common practice, instead of pouring all of the hot water for a particular brewing cycle through the coffee grounds, a portion of the hot water is diverted past the coffee grounds directly into the brewed coffee to adjust for the depth of the bed of ground coffee, the amount of coffee grounds employed, and the grind of the coffee, so as to provide brewed coffee having the desired characteristics of strength and aroma. However, such bypassing of the coffee grounds with a portion of the hot water has heretofore been done manually, either by hand pouring or by swinging a pouring spout between pour and bypass positions, and with no control other than simple guesswork to determine the percentage of hot water that was bypassed. Accordingly, although the reason for diverting a portion of the hot water past the coffee grounds was to adjust for such factors as the depth of the coffee bed, the amount of coffee grounds and the type of grind, in an attempt to improve the brewed coffee, there was no assurance that in fact the brewed coffee would have the desired characteristics of strength and aroma, and the quality of the brewed coffee was likely to vary substantially from brew to brew.

SUMMARY OF THE INVENTION

In view of these and other problems in the art, it is an object of the present invention to provide, in a restaurant type coffee urn, automatic means forming a part of the hot water feed of the urn for diverting a predetermined portion of the hot water that is fed to each brew kettle past the bed of coffee grounds, so that only the remainder of the hot water will pass through the grounds.

Another object of the invention is to provide hot water feed apparatus for a restaurant type coffee urn which includes valve means associated with the hot water feed to each brew kettle for adjustment of the relative proportions of the hot water that is fed to the coffee grounds and that which is diverted past the coffee grounds directly into the bottom of the brew kettle.

Another object of the present invention is to provide automatic bypass hot water feed apparatus of the character described, wherein first hot water discharge means is supported generally centrally in each brew kettle lid for discharging hot water into the coffee grounds during a brewing cycle, and second hot water discharge means is supported in the lid adjacent the periphery thereof for dispensing a portion of the hot water down through the peripheral space between the wall of the brew kettle and the basket or riser containing the coffee grounds so as to bypass the coffee grounds, with the hot water being supplied to such first and second discharge means through flexible conduit means from the main body of the coffee urn to permit the lid to be raised and lowered for insertion and removal of the basket or riser containing the coffee grounds.

A still further object of the invention is to provide coffee urn hot water feed apparatus of the character described wherein the hot water is pumped from the vessel formed in the jacket or shell of the urn by an electrical water pump which provides the hot water at a substantially uniform rate of flow for a predetermined interval of time to provide a predetermined total volume of water for each brew cycle, such volume of water being provided to the brew kettle through an adjustable bypass valve which automatically bypasses a predetermined percentage of the hot water from the pump past the coffee grounds directly into the brewed coffee in the kettle, while the remainder of the hot water from the pump is passed by the valve to the coffee grounds for brewing the coffee.

Further objects and advantages of the present invention will appear during the course of the following part of the specification, wherein the details of construction and mode of operation of a presently preferred embodiment are described with reference to the accompanying drawings, in which:

BRIEF DESCRIPTION OF THE DRAWINGS

FIG. 3 is an enlarged, fragmentary, vertical section taken on the line 3—3 in FIG. 2.

FIG. 4 is a vertical section taken on the line 4—4 in FIG. 2, illustrating portions of the apparatus in elevation.

FIG. 5 is a fragmentary, vertical section taken on the line 5—5 in FIG. 4.

FIG. 6 is an enlarged, fragmentary, vertical section taken on the line 6—6 in FIG. 5.

FIG. 7 is a horizontal section taken on the line 7—7 in FIG. 6.

FIG. 8 is a side elevational view, partly in section, illustrating one of the adjustable by pass valves employed in the apparatus shown in FIGS. 1 to 7.

DETAILED DESCRIPTION

Figure 1:
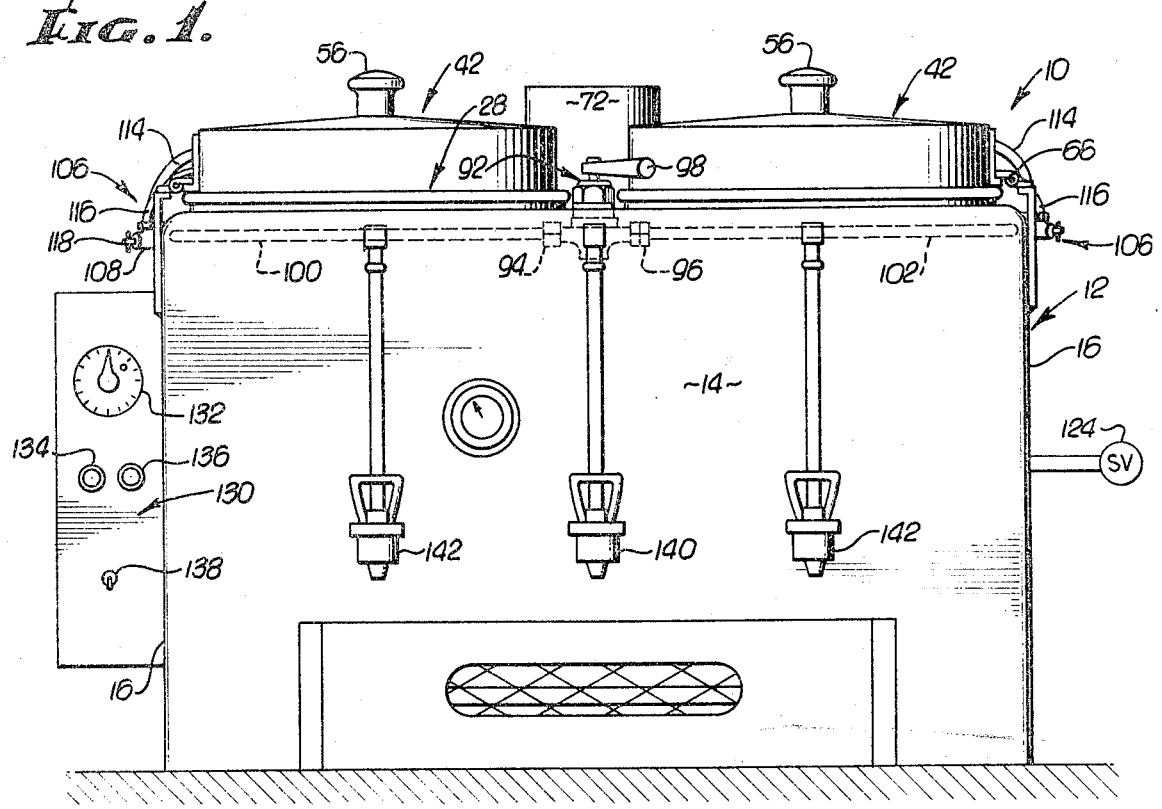
FIG. 1 is a front elevational view of a two-kettle coffee urn embodying the automatic bypass hot water feed of the present invention.

Referring to the drawings, the present invention is illustrated in connection with a restaurant type coffee urn 10 which is otherwise of generally conventional construction. The urn 10 which is illustrated includes the usual jacket or shell 12, which forms the body of the urn, comprising front wall 14, side walls 16, rear wall 18, top wall 20 and upwardly recessed bottom wall 22. The front, side, rear and bottom walls define a vessel within which hot water 24 is heated and stored for brewing the coffee.

The top wall 20 is generally horizontal and is provided with a pair of circular openings 26 through which respective brew kettles or liners 28 are inserted, the kettles 28 being adapted for brewing and storing hot coffee 30.

Each of the brew kettles 28 is of stepped configuration adjacent its upper edge, having an upwardly facing annular shoulder 32 upon which a wire retainer 34 rests, the retainer 34 supporting a basket or riser 36 centrally within the upper portion of each kettle 28. The basket or riser 36 has a perforate bottom wall (not shown), and is adapted to contain coffee grounds which are held in a suitable porous paper or bag recptacle, and through which hot water is dispensed to make the coffee 30. The basket or riser 36 has a substantially smaller outer diameter than the inner diameter of the wall of kettle 28 to provide an annular clearance 37 therebetween through which a portion of the hot water dispensed in each brewing cycle may pass so as to bypass the bed of coffee grounds in the basket or riser 36.

The stepped upper portion of each of the brew kettles 28 further includes an outwardly turned annular flange 38, and terminates in an up-turned lip 40. Each brew kettle 28 is provided with a lid 42 which includes a generally disc-shaped covering web 44 and a downwardly directed peripheral skirt portion 46 which is generally cylindrical, the skirt 46 terminating in a beaded lower edge 48.

Hot water is dispensed into the bed of coffee grounds contained in the basket or riser 36 through a spray head 50 that is mounted at the bottom of a tubular fitting 52, the fitting 52 being supported within the kettle lid 42 by means of a threaded stud 54 which projects upwardly from fitting 52 through an orifice in the center of the lid and is threadedly engaged with an external handle 56 on the lid. The fitting 52 is tightly secured in this central position within the kettle lid 42 by a wrenching portion 58 which abuts against the underside of the kettle lid in opposition to the handle 56 which abuts against the top of the kettle lid.

A straight, horizontally disposed tubular fitting 60 extends through the cylindrical skirt portion 46 of kettle lid 42 adjacent the upper edge of the skirt, and is permanently secured in this position as by welding or brazing so that portions of the tubular fitting 60 project both internally and externally of the kettle lid 42. Flexible tubing 62 connects the inner end of tubular fitting 60 to the spray head fitting 52, the tubing 62 extending in a radial direction within the kettle lid 42 just beneath the cover portion 44 thereof.

Another tubular fitting 64 extends through the wall of the cylindrical skirt portion 46 of the kettle lid, the fitting 64 also being permanently secured in position as by welding or brazing, and having a generally horizontal portion extending outside of the kettle lid 42, and a down-turned spout portion 65 inside of the kettle lid 42 and located so as to direct a stream of hot water therefrom into the annular clearance 37 between the basket or riser 36 and the annular wall of the brew kettle or liner 28 so that this stream of water will completely bypass the bed of coffee grounds within the basket or riser 36.

Although the kettle lids 42 may be otherwise movably mounted so that they can be conveniently removed from their respective kettles 28 and replaced thereon for removing and replacing the baskets or risers 36 from the kettles, it is preferred to support the kettle lids 42 on the urn jacket 12 by means of respective hinges 66 so that the kettle lids 42 can be conveniently pivoted about respective horizontal axes between their closed and open positions.

Hot water 24 is pumped from the vessel or reservoir defined in the urn jacket 12 by means of a brew cycle pump generally designated 68 which is a constant speed pump that is energized to operate for a predetermined interval of time so as to pump a predetermined volume of water from the reservoir in the urn jacket into either one of the brew kettles 28 according to which is selected. The pump 68 includes constant speed motor 72 that is mounted above the top wall 20 of the urn jacket in a protective housing 72, the motor driving a shaft 74 which extends vertically down into the urn within a tubular housing 76. The shaft 74 extends through a water-tight bearing 78 disposed in the bottom of the tubular housing 76, and has a rotor 80 mounted on its lower end. The rotor 80 is rotatable within pump housing 82 supported on the lower end of the tubular housing 76, the pump housing 82 having a central inlet opening 84 in its bottom wall axially aligned with the shaft 74, and having a peripheral outlet extension 85 having an upwardly directed outlet fitting 86 thereon. Thus, the brew cycle pump 68 is a centrifiugal type of pump in which the rotor does not engage the adjacent wall of the pump housing, whereby wear is minimized and particulate impurities are not generated from friction of the rotor against its housing.

Figure 2:
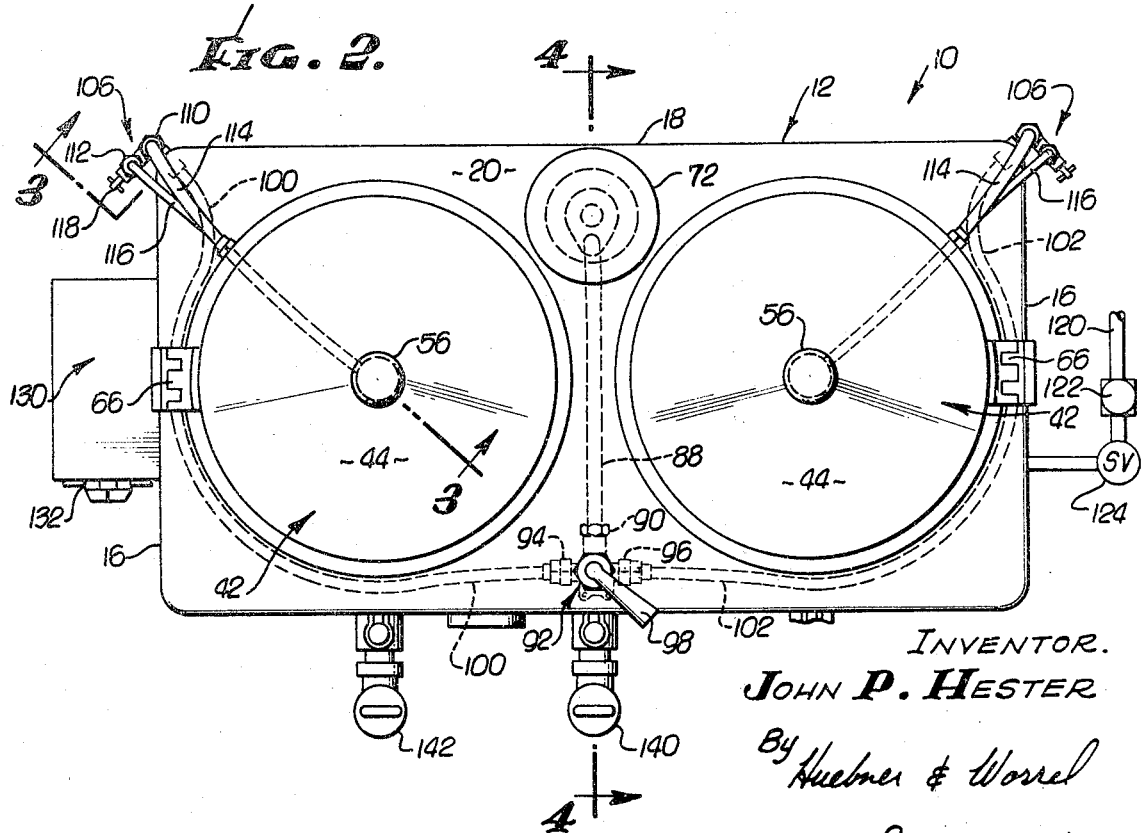
FIG. 2 is a top plan view of the urn shown in FIG. 1.

The brew cycle pump 68 is preferably located just forward of the rear wall 18 of the urn and generally centrally positioned laterally between the kettles 28. Flexible tubing 88 extends upwardly and forwardly from outlet fitting 86 to the inlet fitting 90 of a selector valve 92 mounted on the top wall 20 of the urn jacket adjacent the front wall 14 and generally intermediate the two brew ketles 28. The selector valve 92 has a pair of outlet fittings 94 and 96 located on opposite sides thereof, and includes an external selector lever 98 which is manually movable to direct the flow of hot water provided by the pump 68 to either of the two valve outlet fittings 94 or 96 so as to direct the flow of hot water to either of the brew kettles 28. For convenience of operation, the selector valve 92 is arranged so that the selector lever 98 is simply pointed in the general direction of the brew kettle 28 which is to receive the flow of hot water for the particular brewing cycle. Thus, with the selector lever 98 directed to the right as illustrated in FIGS. 1 and 2 of the drawings, hot water will be directed to the selector valve outlet fitting 96, and thence to the right-hand brew kettle 28 as viewed in FIGS. 1 and 2.

The selector valve outlet fittings 94 and 96 aer connected by respective conduits 100 and 102 to the inlet fitting 104 of respective adjustable bypass valves 106 which are preferably located proximate the upper rear corners of the urn jacket 12.

Each of the adjustable bypass valves 106 includes a generally horizontal, tubular valve body 108 located externally of the urn jacket 12 and having the valve inlet fitting 104 projecting horizontally therefrom through the wall of jacket 12 into the inside of the jacket, the inlet fitting 104 being threaded to receive a plurality of nuts or collars 109 which secure the valve in position on the urn jacket 12. Both a brew outlet fitting 110 and a bypass outlet fitting 112 project upwardly from the valve body 108, the brew outlet fitting 110 being connected by flexible tube 114 to the tubular fitting 60 on the kettle lid 42, and the bypass outlet fitting 112 being connected by flexible tube 116 to the tubular fitting 64 on the kettle lid 42.

Each of the adjustable bypass valves 106 includes a valve element 118 threadedy engaged in the respective valve body 108 for adjustable axial positioning of the valve element 118 in the respective valve body 108. The brew outlet fitting 110 of each bypass valve 106 is located on the valve adjacent the inlet fitting 104 so that hot water will always freely flow from the inlet fitting 104 to the main outlet fitting 110, and thence through the flexible tube 114, the straight tubular fitting 60 on the kettle lid, and thence through the flexible tubing 62 within the lid to the fitting 52 of the spray head 50 to be sprayed onto the coffee ground bed in the basket or riser 36.

The bypass outlet fitting 112 projects upwardly from a central portion of the valve body 108, and anywhere from 0% to approximately 40% of the total amount of hot water furnished to the valve through its inlet fitting 104 may be diverted through the bypass outlet fitting 112 by suitable manipulation of the valve element 118, this bypass flow then passing through the flexible tube 116 to the tubular fitting 64 to be dispensed from the downturned spout 65 thereof through the clearance 37 between the basket or riser 36 and the annular wall of the kettle 28.

In normal use of a restaurant type coffe urn the same brand and grind of coffee will be employed for an extended period of time, and also the same amount of coffee and depth of the bed of coffee grounds will be used. Under such circumstances the valve element 118 will be adjusted until the preferred proportion of the hot water provided to each brew kettle is diverted through the bypass fitting 112 to provide the optimum flavor and aroma of the brewed coffee 30, and then the valve element 118 may be left in this position for an extended period of time, and this same proportion of the total volume of hot water furnished to each brew kettle during each brewing cycle will be automatically diverted past the coffee grounds during each brewing cycle as long as the valve element 118 is left in this position. In the event that some variation occurs in the manner in which the basket or riser 36 is filled with coffee grounds, or if there is a change in the brand or grind of the coffee, the proportion of hot water that is diverted past the coffee grounds can be varied to again obtain an optimum brew by a simple readjustment of the position of valve element 118 in the valve body 108.

The flexible tubes 62, 88, 114 and 116 may be composed of any suitable flexible plastic material capable of withstanding the temperature of the hot water passing therethrough, and which is generally durable and sanitary. The use of the flexible tubing sections 114 and 116 between each of the bypass valves 106 and its respective kettle lid 42 permits normal movement of the lid 42 between its closed and open positions, while at the same time automatically dispensing the hot water partly to the coffee grounds and partly diverted around the coffee grounds, without requiring manual manipulation of one or more swing-type spouts.

Water is provided to the urn vessel from a water inlet pipe 120 through a manual gate valve 122 and a solenoid inlet valve 124. The solenoid valve 124 permits automatic refill of the urn reservoir from the external water supply provided through inlet pipe 120, the refill operation being controlled by a pair of probes 126 and 128 which extend down into the vessel defined within the urn jacket 12 as seen in FIGS. 4 and 5. The probes 126 and 128 are electrically connected to a control box 130 attached to one side of the urn as shown in FIGS. 1 and 2, and suitable electrical apparatus of conventional construction is provided within the control box 130 to cause the solenoid valve 124 to open and thereby admit water from pipe 120 into the urn vessel when the level of water 24 in the vessel drops below the bottom of the long probe 128, the solenoid valve 124 remaining open until the level of water 24 rises sufficiently high to engage the free end of the short probe 126, at which time the solenoid valve 124 is automatically shut off.

The control box 130 also has a time control 132 thereon which is turned to a stop position to initiate a brew cycle, and will cause the brew cycle pump 68 to furnish water to one of the brew kettles 28, according to the setting of selector lever 98, for a predetermined interval of time. This interval of time can be adjusted by adjustment of the time control 132.

The control box 130 may also include a brew lamp 134 which is illuminated when the temperature of the water 24 in the urn has risen to a thermostatically controlled brew temperature, thus indicating when a brew cycle can be commenced by actuation of the time control 132. A timer lamp 136 on the control box 130 is illuminated during each brewing cycle; i.e., when the brew cycle pump 68 is operating. A refill switch 138 is provided on the control box 130 for manually overriding the automatic refill cycle as determined by the probes 126 and 128, the switch 138 controlling the opening and closing of the solenoid inlet valve 124.

Conventional hot water spigot 140 and coffee spigots 142 are provided on the front wall 14 of the urn 10.

While the present invention has been shown and described herein in what is conceived to be the most practical and preferred embodiment, it is recognized that departures may be made therefrom within the scope of the invention, which is therefore not to be limited to the details disclosed herein, but is to be accorded the full scope of the claims.

I claim:

1. In a coffee urn of the type having a body defining a hot water reservoir therein and at least one upwardly opening brew kettle mounted in the body, the brew kettle having a lid that is movable between closed and open positions and having a removable holder for coffee grounds supported therein with a clearance provided between the holder and the wall of the kettle, hot water feed apparatus which comprises first hot water discharge means supported in said lid and directed to discharge hot water into said coffee ground holder for brewing coffee, second hot water discharge means supported in said lid and directed to discharge hot water into said kettle through said clearance so as to bypass said coffee ground holder, hot water pump means in said body having an inlet communicating with said hot water reservoir and having outlet conduit means including first and second branch conduits connected to said first and second hot water discharge means, respectively, so as to divide the pump output flow between said first and second hot water discharge means, said outlet conduit means including a deformable portion between the body and the lid permitting movement of the lid between closed and open positions.

2. Apparatus as defined in claim 1, wherein said deformable portion of said outlet conduit means comprises flexible tube means.

3. Apparatus as defined in claim 1, wherein said lid is hingedly connected to said body for pivotal movement of the lid about a generally horizontal axis between its closed and open positions.

4. Apparatus as defined in claim 1, which includes adjustable valve means in said outlet conduit means associated with at least one of said branch conduits to permit adjustment of the relative amount of hot water furnished to said first and second hot water discharge means.

5. Apparatus as defined in claim 4, wherein said valve means is mounted on the urn body.

6. Apparatus as defined in claim 4, wherein said pump means is of the type providing a substantially constant output flow rate, and which includes timer means connected to said pump means for causing the pump means to operate for a predetermined interval of time for each brew cycle, whereby the pump means will deliver a predetermined volume of hot water to said outlet conduit means for each brew cycle, said volume being divided between said first and second hot water discharge means in relative proportions determined by the adjustment of said valve means.

7. Apparatus as defined in claim 4, wherein said valve means comprises a bypass valve having an inlet and first and second outlets, said outlet conduit means including a conduit portion extending from said pump to said valve inlet, and said first and second branch conduits extending from said first and second valve outlets, respectively, to said first and second hot water discharge means, respectively.

8. Apparatus as defined in claim 7, wherein said valve means is mounted on the urn body, and wherein said deformable portion of said outlet conduit means comprises flexible sections of said first and second branch conduits.

References Cited

UNITED STATES PATENTS

| | | | |
|---|---|---|---|
| 2,748,689 | 6/1956 | Rotman | 99—283 X |
| 3,085,880 | 4/1963 | Matty | 99—283 X |
| 3,291,033 | 12/1966 | Curtis | 99—283 |
| 3,334,571 | 8/1967 | Matty | 99—283 |
| 3,347,150 | 10/1967 | Hrabe | 99—283 |

ROBERT W. JENKINS, Primary Examiner

U.S. Cl. X.R.

99—291, 305, 307